Jan. 11, 1927.

M. J. OWENS 1,614,082

DRAWING SHEET GLASS

Filed June 27, 1923

INVENTOR
Michael J. Owens
BY C. A. Rowley
ATTORNEY

Patented Jan. 11, 1927.

1,614,082

UNITED STATES PATENT OFFICE

MICHAEL J. OWENS, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed June 27, 1923. Serial No. 647,981.

This invention relates to improvements in the art of drawing sheet glass, and more especially to an improved design of container for the pool of molten glass from which the sheet is drawn.

In the process for drawing sheet glass disclosed in the patent to Colburn, 1,248,809, granted Dec. 4, 1917, to which process this present invention is particularly applicable, the pool of molten glass forming the sheet source is held in a shallow draw-pot or container, the upper surface of the pool being exposed to the open air for a limited area in the vicinity of the line of draw of the sheet. The bottom and sides of the container are surrounded by a suitable heating furnace to maintain the glass at the requisite temperature.

It is well-known that in all forms of apparatus for melting and handling molten glass, there is a tendency for that portion of the glass which contacts with the walls of the containing tank or receptacle, or any other solid objects, to become chilled and sometimes devitrify and form so-called "dog-metal". In spite of the fact that the receptacle from which the sheet is drawn is surrounded as far as possible by a heated atmosphere, as described above, trouble is sometimes caused by the formation of devitrified glass along the side walls of the container, particularly adjacent the edges of the forming sheet.

In former practice the level of the molten glass in this container has been maintained very close to the upper edge of the receptacle. I have discovered that by considerably lowering the level of the glass in this container the formation of this devitrified glass or dog-metal may be entirely avoided. This lowering of the glass level may be accomplished in either of two ways,—that is, by maintaining less glass in the receptacle, or if this would not leave a sufficient depth of glass in the container, the side walls of the container must be elevated to provide the required difference in height between the glass level and the upper edges of the container. By thus lowering the glass level, two things are accomplished. The heating chamber enclosing the sides of the receptacle is elevated above the upper surface of the glass so that the entire body of molten glass in the receptacle is within the heated zone. Furthermore, the elevation of the side walls of the container above the glass level shields the side portions of the exposed surface of the pool from cooling drafts of air. The result is that the molten glass adjacent the edges of the pool, and particularly the surface glass, is maintained in a sufficiently highly heated condition to avoid devitrification. The invention will be better understood from the following detailed description of certain forms of the apparatus embodying the principles of this invention.

Figure 1:
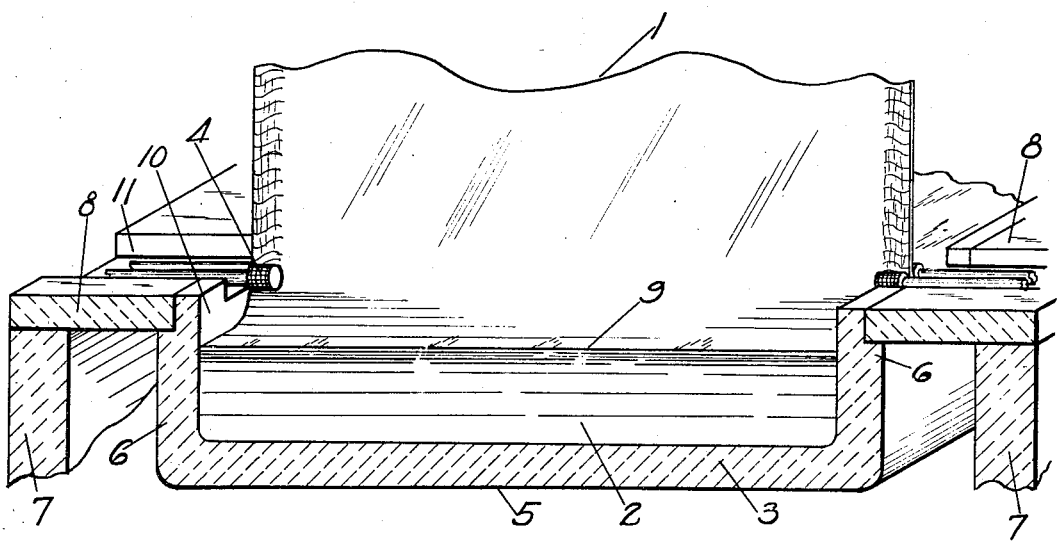
Fig. 1 is a perspective of a portion of the sheet-drawing apparatus, the container for the molten pool being shown in transverse vertical section.

The sheet of glass 1 is drawn upwardly from the pool of molten glass 2 in the shallow receptacle 3. The mechanism for drawing the sheet of glass is not here illustrated but may be of the form described in detail in the Colburn patent referred to above. At 4 is indicated the knurled edge-drawing rollers which maintain the width of the sheet, as more fully explained in the patent mentioned.

The receptacle 3 is closed at the bottom and three sides, and open at the top and at one side or end where the molten glass flows in from a continuous tank furnace or other suitable source of molten glass. A suitable heating furnace surrounds the bottom 5 and sides 6 of the receptacle to maintain the molten glass therein at a suitable working temperature. The side portions of this heating chamber which heat the side walls 6 of the container, comprise the outer walls 7 and upper cover-plate 8 which join the wall 7 with the side walls 6 of the container. The upper surface of the pool 2 adjacent source of sheet 1, is exposed to the open air. This is not only to allow room for drawing the sheet upwardly, but it is necessary that the temperature of this surface glass be lowered to give it the proper plasticity for drawing into sheet form.

In former practice, the container 3 has been kept very nearly full of molten glass, so that the glass level 9 was very near the upper edges of the receptacle. The upper cover-plate 8 of the heating chamber which are exposed to the air and have a large radiating surface, are consequently considerably cooler than the walls of the container and have a chilling effect on the upper portions of the side walls 6 where these plates 8 join thereto. This has resulted in the side portions of the molten pool becoming somewhat chilled adjacent the upper edges of the receptacle. Furthermore, drafts of air which come in from the sides of the apparatus and strike the glass adjacent the receptacle have added to this cooling effect, and the result has been that at times portions of this edge glass have become devitrified.

According to this invention, the side walls 6 of the receptacle and the entire side portions of the heating chamber have been elevated sufficiently to bring the lower sides of cover-plates 8 considerably above the level 9 of the molten pool. In this way the heating atmosphere in the side portions of the furnace is extended up beyond the glass level so as to exert its influence on the entire body of glass in the receptacle. Furtheremore, the inner walls 10 of the receptacle are elevated sufficiently above the level of the pool to shield the side portions of the pool from the drafts or currents of air which enter the machine at the open sides adjacent the sheet source. The edge-forming rollers 4 will operate more effectively if they are rather close to the surface of the molten pool. For this reason the cover-plates 8 are notched out as at 11 as far down as possible to bring these rollers 4 near the molten glass.

Figure 2:
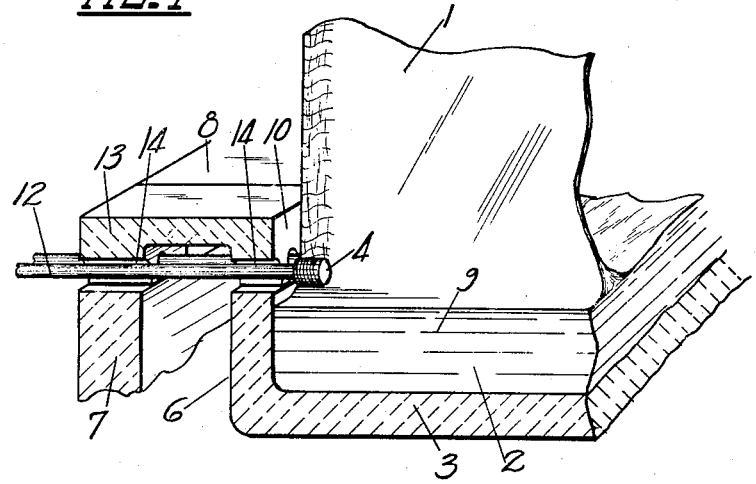
Fig. 2 is a similar view of a modified form of container.

In Fig. 2 a slightly modified form of the apparatus is disclosed. In this case the supporting drive shafts 12 for the knurled edge rollers 4 are carried directly through the side portions of the heating chamber. These shafts 12 are internally water-cooled so that they may pass through this chamber without being damaged by overheating. The cover tiles 8 directly over the shafts 12 are replaced by cover blocks 13, suitably notched at 14 to fit shafts 12, which may be removed when it becomes necessary to adjust or replace the knurled rollers 4 and their supporting shafts. With this latter design the side walls of the receptacle may be carried as high as desired above the glass level, without elevating the rollers 4 unduly from their proper position adjacent the surface of the molten pool.

Claims:

1. In sheet glass apparatus, a receptacle containing a mass of molten glass from which a sheet of glass is continuously drawn, supplementary walls spaced from the walls of the container, means resting upon the top edges of adjacent walls to create a compartment around the container through which heat may be circulated, and sheet edge engaging means arranged substantially horizontally through said walls for engagement with the edges of the sheet being drawn, the level of the molten glass in said receptacle being a substantial distance below the top of the side walls thereof.

2. In sheet glass apparatus, a receptacle containing a mass of molten glass from which a sheet of glass is continuously drawn, supplementary walls spaced from the walls of the container, means resting upon the top edges of adjacent walls to create a compartment around the container through which heat may be circulated, and rotatable sheet width maintaining devices arranged substantially horizontally through said walls and adapted for engagement with the edges of the sheet being drawn, the top of the walls being a substantial distance above the level of the molten glass in said receptacle, said edge engaging means being arranged above the level of said molten glass.

Signed at Toledo, in the county of Lucas and State of Ohio, this 25th day of June, 1923.

MICHAEL J. OWENS.